US007174085B2

(12) United States Patent
Demas et al.

(10) Patent No.: US 7,174,085 B2
(45) Date of Patent: Feb. 6, 2007

(54) APPARATUS AND METHOD OF SEAMLESS SWITCHING BETWEEN A LIVE DTV DECODING AND A PVR PLAYBACK

(75) Inventors: Jason Demas, Irvine, CA (US); Marcus Kellerman, Aliso Viejo, CA (US); Francis Cheung, Del Mar, CA (US); Sherman Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1255 days.

(21) Appl. No.: 09/933,231

(22) Filed: Aug. 20, 2001

(65) Prior Publication Data

US 2003/0035650 A1 Feb. 20, 2003

(51) Int. Cl.
*H04N 5/781* (2006.01)
*H04N 5/76* (2006.01)
*H04N 5/915* (2006.01)

(52) U.S. Cl. .......................... 386/68; 386/111; 386/124
(58) Field of Classification Search ................ 386/6–8, 386/33, 68, 81, 82, 125, 126
See application file for complete search history.

(56) References Cited

U.S. PATENT DOCUMENTS

| | | | | |
|---|---|---|---|---|
| 5,701,383 A | * | 12/1997 | Russo et al. | .................. 386/46 |
| 6,233,389 B1 | | 5/2001 | Barton et al. | |
| 6,304,714 B1 | * | 10/2001 | Krause et al. | ................. 386/52 |
| 6,480,667 B1 | * | 11/2002 | O'Connor | ..................... 386/83 |
| 6,490,000 B1 | * | 12/2002 | Schaefer et al. | ............ 348/553 |
| 6,868,225 B1 | * | 3/2005 | Brown et al. | ................. 386/83 |
| 2003/0170003 A1 | * | 9/2003 | Levesque et al. | ............. 386/68 |

FOREIGN PATENT DOCUMENTS

| | | |
|---|---|---|
| EP | 1104201 A | 5/2001 |
| WO | WO-01/11865 A | 2/2001 |
| WO | WO 01/11865 A1 * | 2/2001 |

* cited by examiner

*Primary Examiner*—Thai Q. Tran
*Assistant Examiner*—Gelek Topgyal
(74) *Attorney, Agent, or Firm*—McAndrews, Held & Malloy, Ltd.

(57) ABSTRACT

Methods and apparatus for switching between a live video decoding and a recorded playback in a digital video and recording system. A received video data stream is transmitted to a first-in first-out video decoder buffer without first looping the video data stream through a playback buffer. The video data stream is transmitted from the video decoder buffer to a video decoder. If a "pause" command is received, the video data stream is transmitted to a first-in first-out playback buffer, while continuing to transmit the video data stream to the video decoder buffer. Transmission of the video data stream to the video decoder buffer is halted when the video decoder buffer fills up. The last byte of the video data stream that was transmitted to the video decoder buffer is marked. If a "play" command is received, the video data stored in the video decoder buffer is transmitted to the video decoder. The video data stored in the playback buffer is transmitted to the video decoder buffer starting at a point immediately after the data element that was marked previously.

11 Claims, 11 Drawing Sheets

APPARATUS AND METHOD OF SEAMLESS SWITCHING BETWEEN A LIVE DTV DECODING AND A PVR PLAYBACK

FIELD OF THE INVENTION

The present invention relates generally to digital television and personal video recorders. More particularly, the present invention relates to methods and apparatus for switching between a live digital television decoding and a personal video recorder playback.

BACKGROUND OF THE INVENTION

One of the disadvantages of digital television (DTV) systems such as set-top boxes (STBs) is that initial channel acquisition and channel change take more time than the analogous functions in analog TV. The longer channel acquisition and channel change times are due largely to the complexity of the decoding process for the live DTV signal. A typical DTV decoding involves numerous functions and processes including demodulation locking, forward-error-correction (FEC) locking, transport stream decryption and filtering, MPEG video sequence header parsing and decoding, frame buffering and display. Because of the complexity of the decoding process, some STBs have about a two to three second delay in channel changes.

Personal video recorder (PVR) systems offer consumers a hard disk-based recording system analogous to analog video cassette recorder (VCR) systems. PVR systems can digitally record live television programs, while offering the versatility of select playback and associated special features. The viewer can take advantage of trick play features such as pause/still, fast forward, slow forward, rewind, slow reverse, skip, etc. Existing PVR systems are capable of performing recording functions on both digital and analog channels. In a typical PVR system, video is generally looped through a playback buffer (typically RAM) before it is sent to the MPEG decoder during any live decoding so that a pause can be seamless. This extra cycle through a buffer increases the time it takes for a user to change channels.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

The present invention relates to methods and apparatus for switching between a live digital television decoding and a personal video recorder playback.

One embodiment of the present invention is directed to a method of switching between a live video decoding and a recorded playback in a digital video and recording system. Pursuant to the method, a stream of digital video data is received. The received video data stream is transmitted to a video decoder without first looping the video data stream through a playback buffer and the video data is decoded with the video decoder. If a command is received that causes the video data stream to be looped through a playback buffer prior to further decoding, the video data stream is transmitted to a first-in first-out playback buffer and the video data is stored in the buffer. The data element of the video data stream that was last transmitted to the video decoder is marked. If a command requiring decoding of the video data stream to resume is received, the video data stored in the playback buffer is transmitted to the video decoder and the video data received from the playback buffer is decoded starting at a point immediately after the previously-marked data element.

Another embodiment of the present invention is directed to another method of switching between a live video decoding and a recorded playback in a digital video and recording system. Pursuant to this method a stream of digital video data is received. The received video data stream is transmitted to a first-in first-out video decoder buffer without first looping the video data stream through a playback buffer. The video data stream is then transmitted from the video decoder buffer to a video decoder and the video data is decoded with the video decoder. If a command is received that causes the video data stream to be looped through a playback buffer prior to further decoding, the video data stream is transmitted to a first-in first-out playback buffer, while continuing to transmit the video data stream to the video decoder buffer, and the video data is stored in the playback buffer. Transmission of the video data stream to the video decoder buffer is halted when the video decoder buffer fills up. The last data element of the video data stream that was transmitted to the video decoder buffer is marked. If a command requiring decoding of the video data stream to resume is received, the video data stored in the video decoder buffer is transmitted to the video decoder and the video data is decoded. The video data stored in the playback buffer is transmitted to the video decoder buffer starting at a point immediately after the data element that was marked previously.

Another embodiment of the present invention is directed to a digital video and recording system that includes a video decoder buffer, a video decoder, a playback buffer and a controller. The video decoder buffer is a first-in first-out buffer that receives and stores a stream of digital video data. The video decoder buffer is adapted to transmit the video data stream to the video decoder. The video decoder decodes the video data stream received from the video decoder buffer. The playback buffer is a first-in first-out buffer that receives and stores the video data stream and is adapted to transmit the video data stream to the video decoder buffer. The controller sends the received video data stream to the video decoder buffer during normal operation, but if a command is received that causes the video data stream to be looped through a playback buffer, the controller sends the video data stream to the playback buffer while continuing to send the video data stream to the video decoder buffer. When the video decoder buffer fills up, the controller halts transmission of the video data stream to the video decoder buffer and marks a data element that was last provided to the video decoder buffer. If a command requiring decoding of the video data stream to resume is received, the controller causes the video data stored in the video decoder buffer to be transmitted to the video decoder and causes the video data stored in the playback buffer to be transmitted to the video decoder buffer starting at a point immediately after the marked data element.

These and various other features as well as advantages which characterize the present invention will be apparent upon reading of the following detailed description and review of the associated drawings.

DETAILED DESCRIPTION OF THE INVENTION

Figure 1:
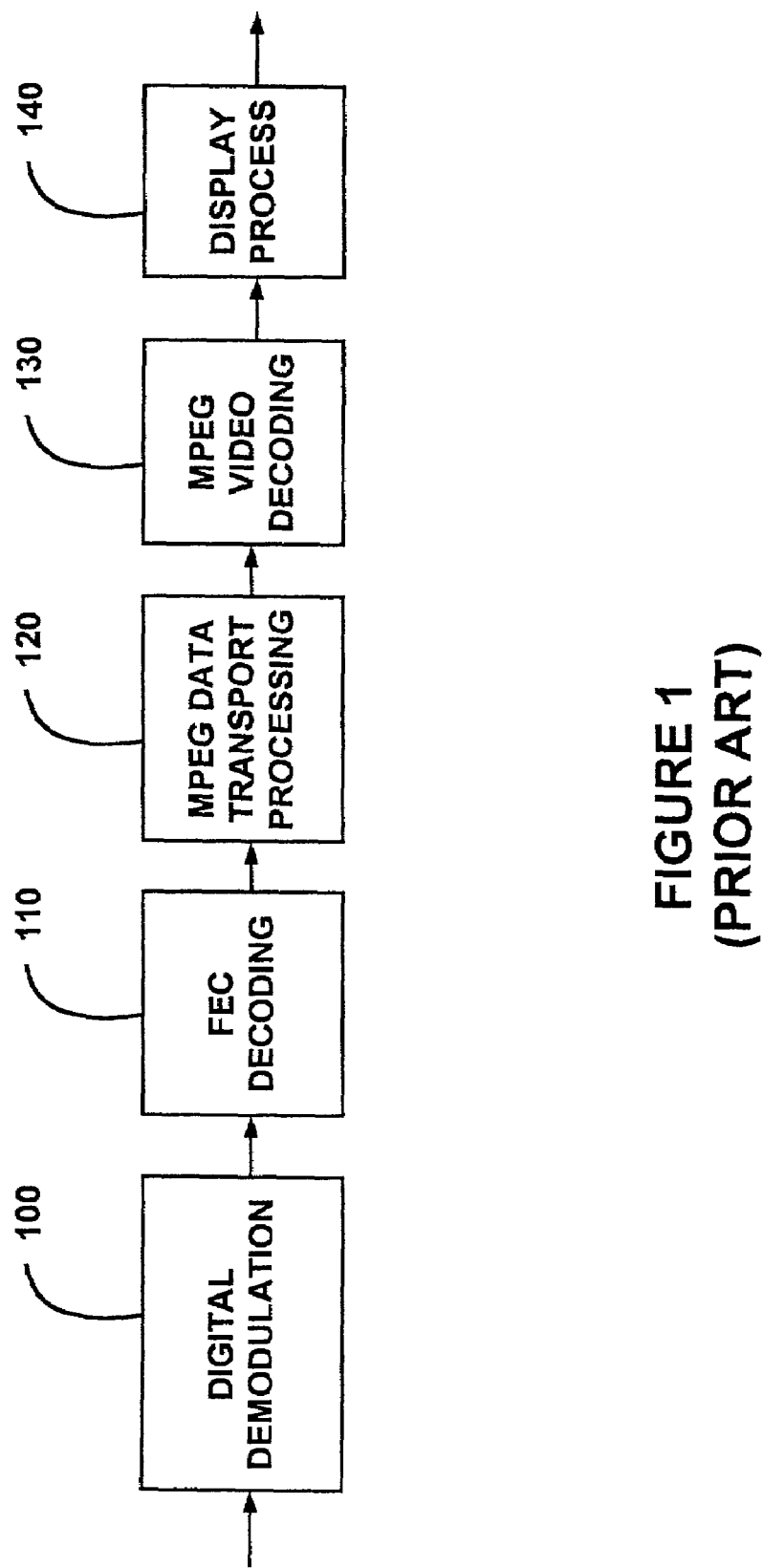
FIG. 1 is a block diagram representing a prior-art live DTV decoding process.

FIG. 1 is a simplified block diagram representing a prior-art live DTV decoding process. The live DTV decoding process involves a multitude of processes including the demodulation of the digital data signal 100, forward-error-correction (FEC) decoding 110, MPEG data transport stream processing 120 (decryption and filtering), MPEG video sequence header parsing and decoding 130, and frame buffering and display processes 140. For this digital decoding process, initial channel acquisition and channel change take longer than with analog TV. In the initial channel acquisition, decoding process has to complete demodulation locking 100, FEC locking 110, transport stream decryption and filtering 120, MPEG video sequence header parsing and decoding 130, and frame buffering and display 140.

In the channel change process, there are two cases. The first case is where two channels belong to the same transport stream. In this case, the demodulator and FEC decoder are already locked. Thus, switching to the new channel decoding only takes transport stream decryption and filtering 120, MPEG video sequence header parsing and decoding 130, and frame buffering and display 140. The second case is where two channels belong to different transport streams. In this case, the channel change is the same as the initial channel acquisition process. In general, channel change is one of the negatives of digital TV, as it is quite slow relative to analog TV. For example, some STBs experience about two to three seconds delay in channel changes.

Personal video recorder (PVR) systems offer consumers a hard disk-based VCR that digitally records live TV programs, while offering the versatility of select playback and associated special features. The viewer can take advantage of trick play features such as pause/still, fast forward, slow forward, rewind, slow reverse, skip, etc. There are two types of PVR decoding schemes: those where the recorded channel is an analog channel and those where the recorded channel is a digital channel.

Figure 2:
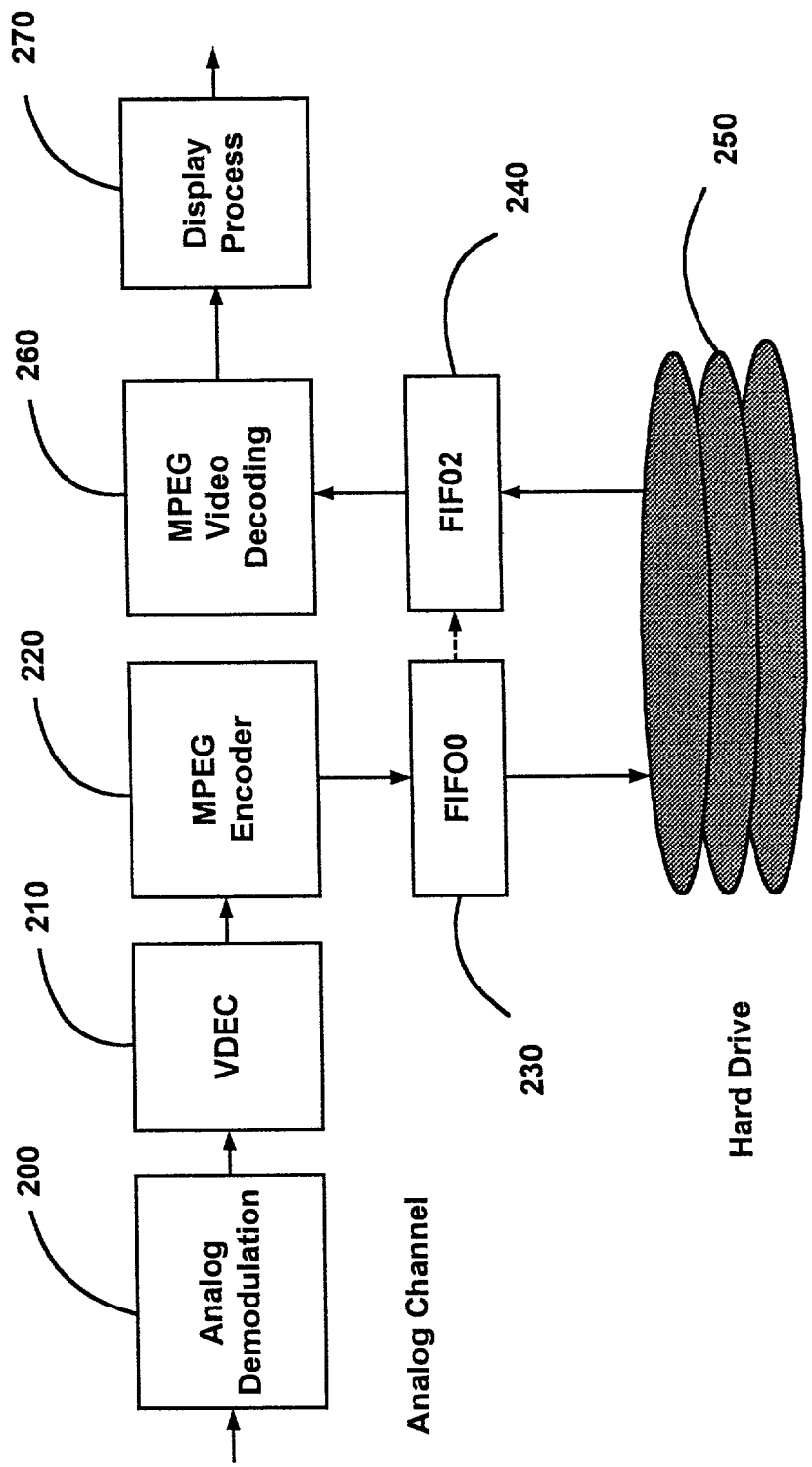
FIG. 2 is a block diagram representing a prior-art PVR video decoding scheme where the recorded channel is an analog channel.

FIG. 2 is a block diagram of a typical prior-art PVR video decoding scheme where the recorded channel is an analog channel. The PVR can accept an analog channel from either the tuner or from the baseband line inputs. The tuner is set to down-convert the selected channel. The analog video signal is then passed to analog demodulation (and descramble) block 200. If the channel is encrypted, an analog descrambler will decrypt the signals, provided that it is authorized. The analog video data signal is then passed to video decoder (VDEC) 210, which converts it to a digital data stream that is then sent to MPEG encoder chip 220. The audio is also converted to a digital data stream by the audio ADC and sent to MPEG encoder chip 220. MPEG encoder chip 220 accepts the digitized video (and audio) and multiplexes them to an MPEG transport stream such as an MPEG-2 transport stream. A transport stream processing module in a data transport processor, or controller (not shown), stores the data in first-in first-out playback buffer 230 (FIFO0). The encoded data are sent from playback buffer 230 to first-in first-out playback buffer 240 (FIFO2) before being sent to MPEG video decoder 260. Playback buffer 230 (FIFO0) and playback buffer 240 (FIFO2) are typically located in RAM memory such as synchronous dynamic RAM (SDRAM). The controller evacuates the data in playback buffer 230 to the hard drive 250 when a pause command is received. MPEG video decoder 260 decodes the video data stream received from playback buffer 240 and sends it to display process functionality 270.

Figure 3:
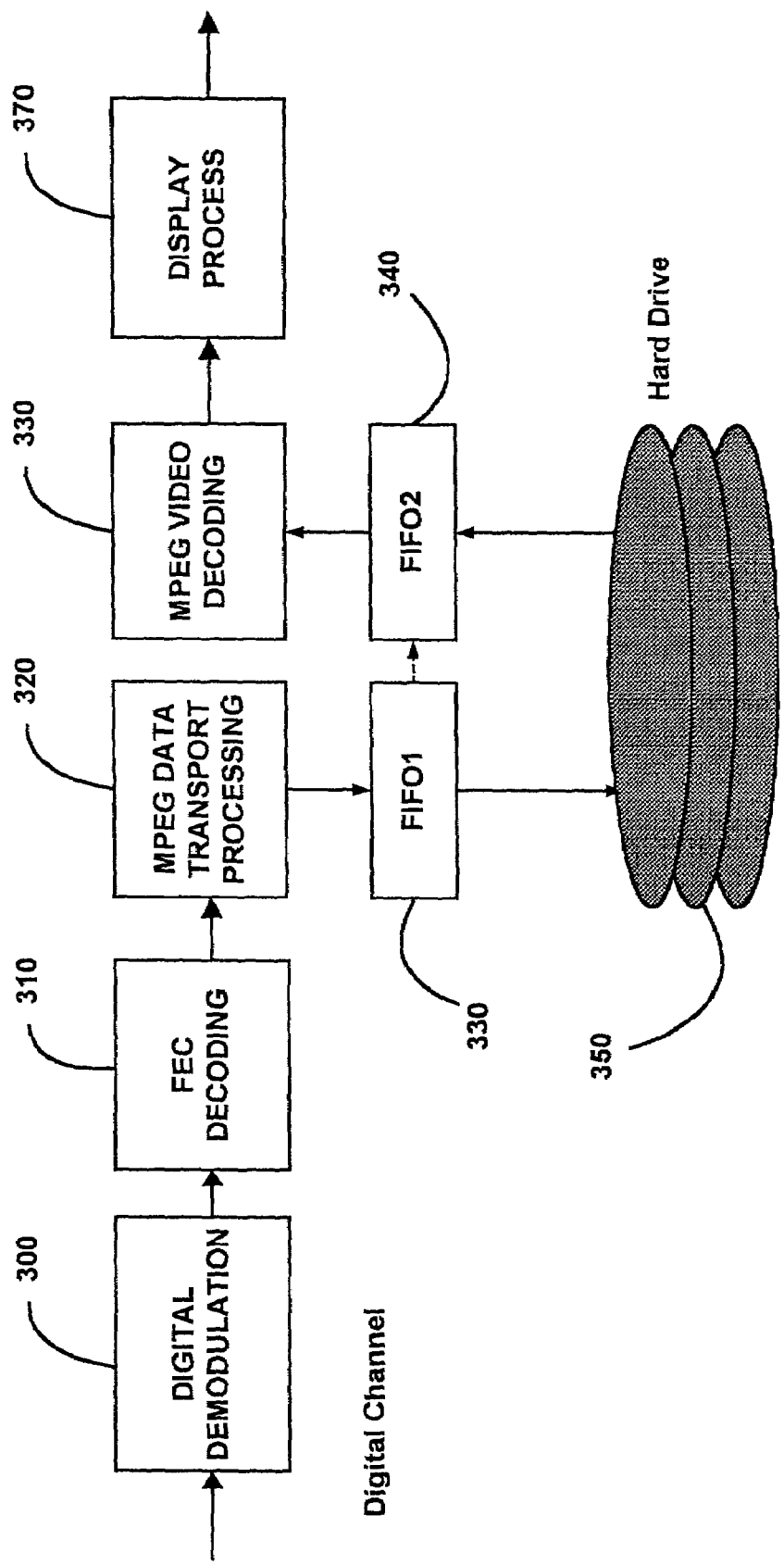
FIG. 3 is a block diagram representing a prior-art PVR video decoding scheme where the recorded channel is a digital channel.

FIG. 3 is a block diagram of a typical prior-art PVR video decoding scheme where the recorded channel is a digital channel. The selected video service is contained in a transport stream. The tuner is set to down-convert the channel that contains the transport stream to IF. Digital demodulator 300 demodulates the IF to base-band digital data and sends the data to forward error correction (FEC) block 310 to decode transport stream packets. FEC block 310 outputs the transport stream and sends the transport stream packets to MPEG data transport processor 320. Data transport processor 320 also selects only the requested service and decrypts the transport stream packets of this service transport stream into clear data if the service is authorized. Data transport processor 320 then re-multiplexes the transport stream into a new transport stream and stores the data in the first-in first-out playback buffer 330 (FIFO1). The transport stream is sent from playback buffer 330 to first-in first-out playback buffer 340 (FIFO2) before being sent to MPEG video decoder 360. Playback buffer 330 (FIFO0) and playback buffer 340 (FIFO2) are typically located in RAM memory such as synchronous dynamic RAM (SDRAM). The controller (not shown) evacuates the data in playback buffer 330 to the hard drive 350 when a pause command is received. MPEG video decoder 360 decodes the video data stream received from playback buffer 340 and sends it to display process functionality 370.

Figure 4:
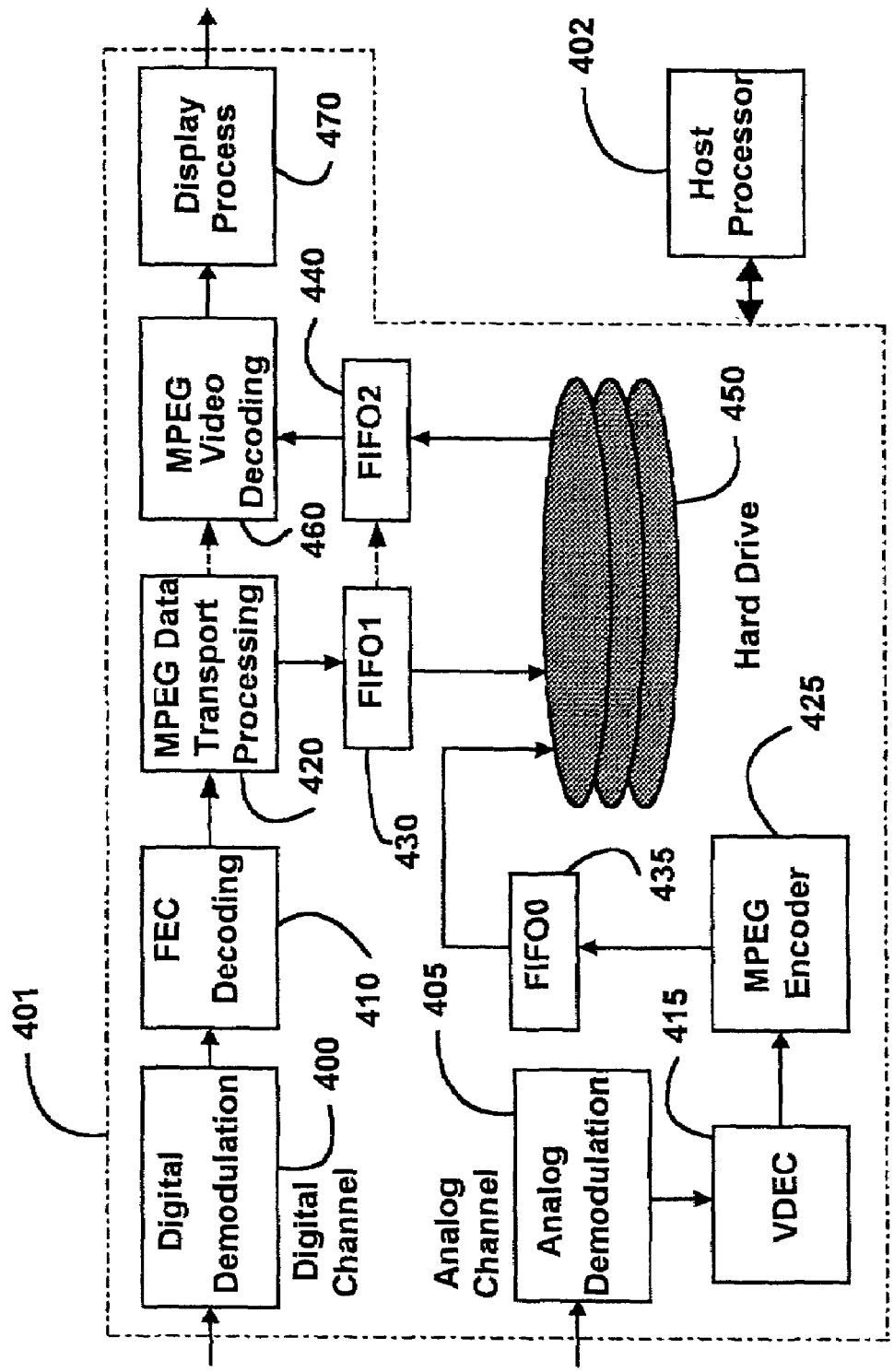
FIG. 4 is a block diagram representing a prior-art complete PVR video decoding scheme showing the live DTV decoding pass, the analog PVR processing pass, and the digital PVR processing pass.

FIG. 4 is a block diagram of a typical prior-art complete PVR video decoding scheme 401 showing the live DTV decoding pass, the analog PVR processing pass, and the digital PVR processing pass. As each of these processes is described in detail above with respect to FIGS. 1–3, they will not be described in detail here. It will be noted, however, that digital demodulator 400, FEC decoder 410 and MPEG data transport processor 420 are shared by the live DTV decoding scheme (described in detail with respect to FIG. 1) and the digital PVR processing pass (described in detail with respect to FIG. 3). It will also be noted that playback buffer 440 (FIFO2) and hard drive 450 are common to the digital PVR processing pass and the analog PVR processing pass (described in detail with respect to FIG. 2). MPEG video decoder 460 and display functionality 470 are shared by all three: the live DTV decoding pass, the digital PVR processing pass and the analog PVR processing pass. Analog demodulator 405, video decoder 415, MPEG encoder chip 425 and playback buffer 435 (FIFO0) are part of the analog PVR processing pass and correspond to elements 200, 210, 220 and 230 in FIG. 2, respectively. Playback buffer 430 (FIFO1) corresponds to playback buffer 330 in FIG. 3. FIG. 4 also shows host processor 402, which controls the flow of data within PVR video decoding scheme 401.

In newly deployed STBs with PVR features, video is generally looped through RAM (such as playback buffers 430, 435 and 440) before it is sent to the MPEG decoder during any live decoding so that a pause can be seamless. This extra cycle through the buffers increases the amount of time required to effect a channel change relative to a live DTV decoding process such as the one shown in FIG. 1.

The present invention provides an apparatus and method for seamlessly switching between a live decoding and a decoding of video data that has been looped through a playback buffer, such that the video is not looped through the playback buffer at the channel changes and a pause in the playback can still be seamless.

Figure 5:
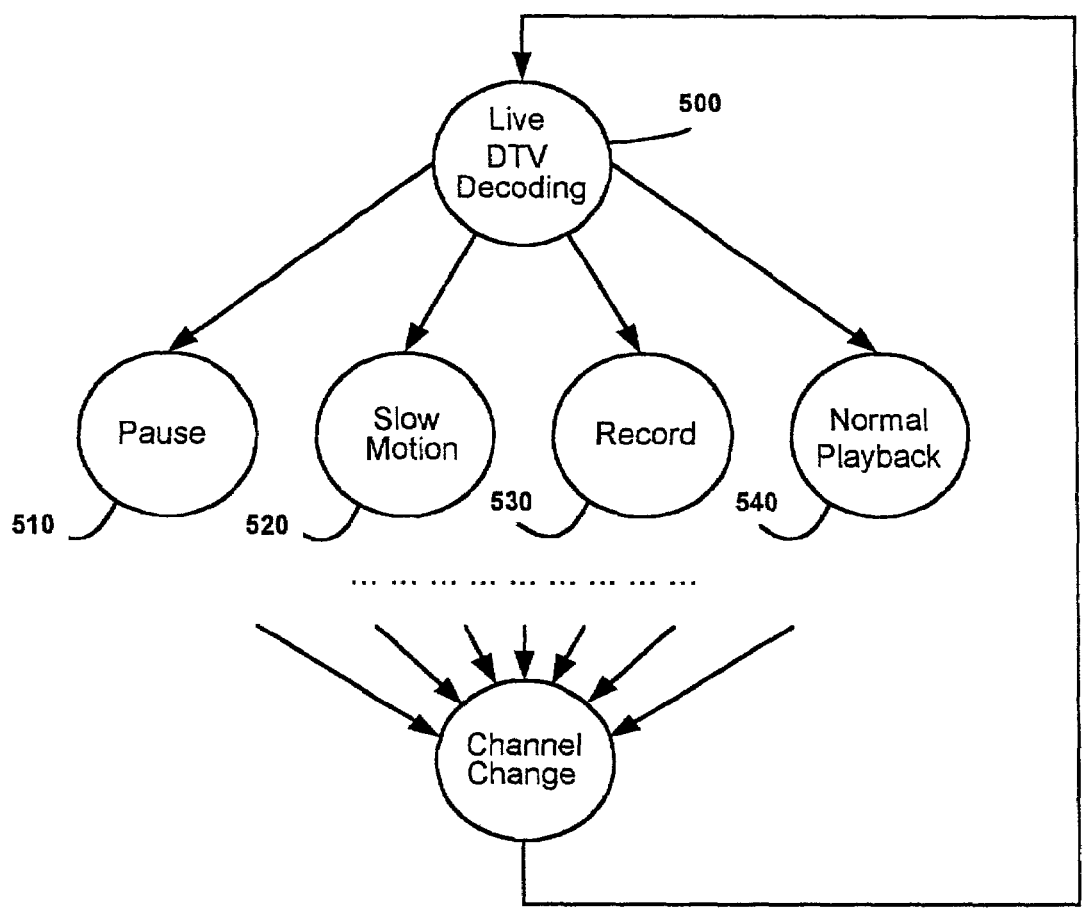
FIG. 5 is a block diagram representing the state changes that transition between the live decoding mode and the PVR playback mode according to an illustrative embodiment of the present invention.

FIG. 5 shows the state changes that transition between the live decoding mode and the PVR playback mode. In the power-up state, the decoder is assumed to be in the live-decoding mode 500. According to the present invention, when the PVR is in the live decoding mode, the incoming video data is decoded without looping the data through a playback buffer. There are a number of functions that the user can request which will cause live DTV decoding to cease and for the incoming video data to be looped through a playback buffer prior to decoding the data. Among these functions are pause 510, slow motion 520, record 530 and normal playback 540. According to the present invention, when a channel change command 550 is received from the user, live decoding of the video data of the new channel is performed without looping the data through a playback buffer, as shown in FIG. 5.

Figure 6:
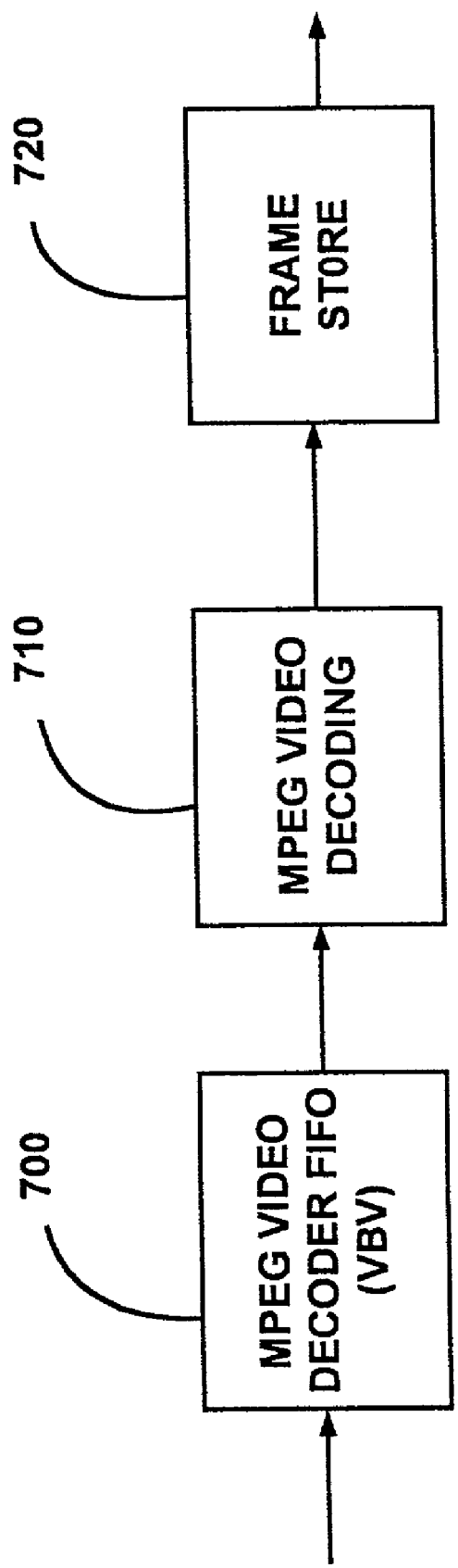
FIG. 6 is a block diagram representing a live MPEG video decoding pipeline according to an illustrative embodiment of the present invention.

FIG. 6 is a block diagram representing a live MPEG video decoding pipeline according to an illustrative embodiment of the present invention. Live channel is acquired without looping through a playback buffer. The received video data stream is provided to video decoder buffer 700. Video decoder buffer 700, in turn, provides the video data stream to video decoder 710. Video decoder 710 decodes the video data and sends the decoded data to frame store 720.

Figure 7:
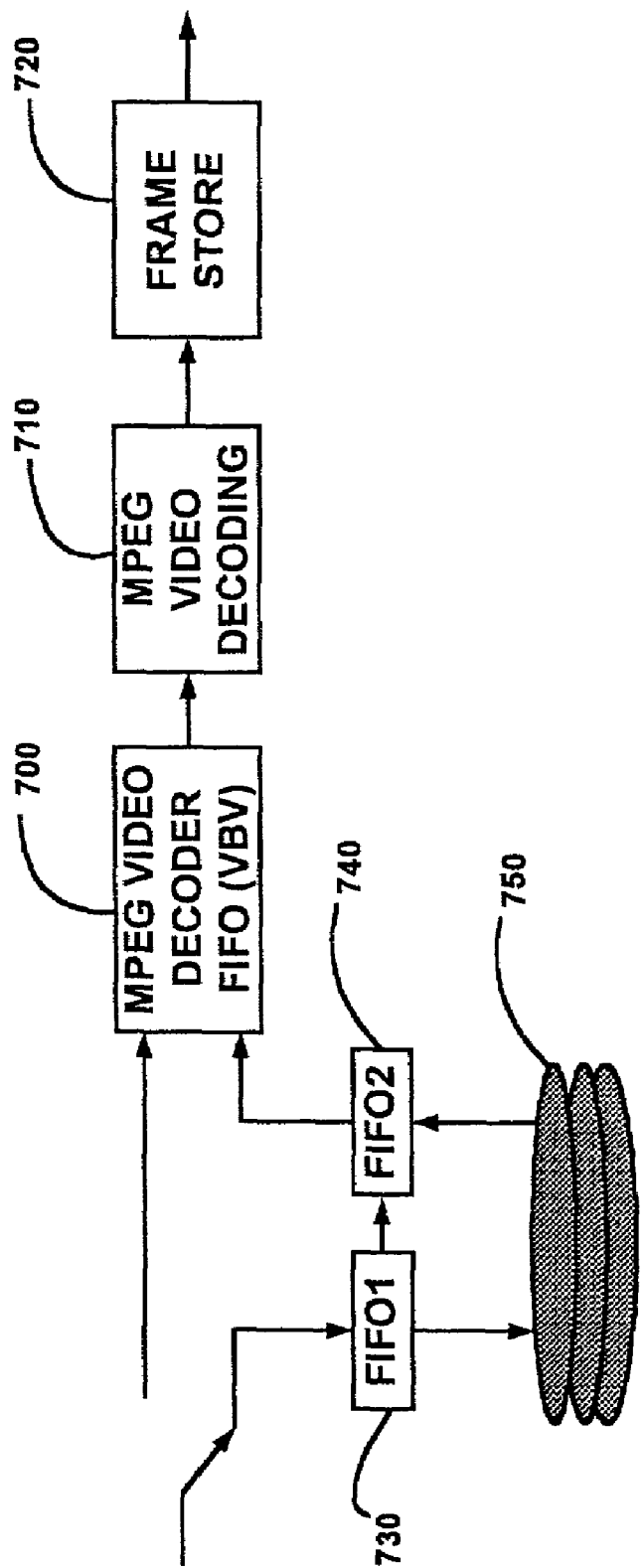
FIG. 7 is a block diagram representing a PVR playback pipeline according to an illustrative embodiment of the present invention.

FIG. 7 is a block diagram representing a PVR playback pipeline according to an illustrative embodiment of the present invention. When the user hits PAUSE, or RECORD, or SLOW MOTION, the incoming video data stream is sent to playback buffers 730 (FIFO1) and 740 (FIFO2) while it is still going to the video decoder buffer 700 of the MPEG decompression engine (not shown). In an illustrative embodiment, playback buffer 730 (FIFO0) and playback buffer 740 (FIFO2) are located in RAM memory such as synchronous dynamic RAM (SDRAM). When the user hits PAUSE, RECORD, or SLOW MOTION, an MPEG "pause" application program interface (API) is called.

According to one illustrative embodiment of the present invention, when video decoder buffer 700 fills up, a "pause" line of video decoder buffer 700 is set to hold off the data transport data flow. The last byte sent to video decoder buffer 700 is flagged in the playback buffers 730 (FIFO1) and 740 (FIFO2). In other words, an address somehow pointing to the last byte consumed in video decoder buffer 700 is saved by the data transport (not shown).

In an alternative embodiment of the present invention, when a command (such as PAUSE, RECORD or SLOW MOTION) is received which causes the incoming video data to be looped through playback buffers 730 and 740, a transport register is set, immediately stopping the feeding of the data to video decoder buffer 730. In addition, the transport record offset of the last byte that was sent to the video decoder buffer 740 is marked. In this embodiment, software is essentially used to control the data flow cutoff, instead of the pause line. With this method there will be no loss of audio data.

In another alternative embodiment, when a command is received which causes the incoming video data to be looped through playback buffers 730 and 740, two extra registers/bits (for each record channel) are set. A "STOP-SENDING-DATA-TO-DECODERS-BIT" is set. This bit will halt the transmission of data to the video decoder bus at the next possible transport packet boundary. A "BYTE-OFFSET-WHEN-DATA-WAS-STOPPED" register is maintained. This register will hold the byte offset (of the record channel) describing when the data was stopped being sent to the video decoder buffer 730.

In still another alternative embodiment of the present invention, when a PAUSE, RECORD, or SLOW MOTION command is received, instead of stopping all PIDs described by the record, one can simply specify a single PID that should no longer be sent to the decoder, while still capturing the record byte offset when that PID was stopped being sent.

A controller, such as the host processor, is responsible for evacuating the recorded data stored in playback buffer 730 (FIFO1) to the hard drive 750 during the PAUSE, RECORD or SLOW MOTION operation.

When the user presses "play", an API to run the video decoder 710 in "vsync" mode is called, and the consumption of video decoder buffer 700 begins again where it left off. To fill video decoder buffer 700, playback begins from playback buffer 740 (FIFO2). The host begins playback from playback buffer 740 with the byte after the last byte already sent to video decoder buffer 700 (as marked by the data transport during decode). The incoming video data stream is looped through playback buffers 730 (FIFO1) and 740 (FIFO2) before being sent to the video decoder 710, instead of providing the video data stream directly to the video decoder 710.

The timing of the decoding process for an MPEG-2 transport stream is calculated by the timing-recovery logic using program clock references (PCRs), decoding time stamps (DTSs) and presentation time stamps (PTSs) carried by the stream. Different timing-recovery modes are utilized depending on whether the PVR is operating in live-decode mode or in PVR playback mode.

During live decode, the timing-recovery logic is programmed to monitor the PCRs in the transport stream. If a PCR discontinuity bit is seen in the incoming transport stream, the new PCR is simultaneously sent to the video system time clock (STC) and the timing-recovery logic's local STC. At the same time, the timing-recovery logic monitors PCRs in the stream against its own STC. This is called the timebase managed mode. When the first PCR is seen in the transport stream, the timing-recovery logic will initialize all STCs (video, audio, and its own local copy) with the value in the PCR. Because the video decoder is configured to startup in timebase managed mode, it is waiting during this configuration period for a PTS in the stream to equal its STC (within a programmable window). Video decoder 710 will not begin decoding and displaying images in the timebase managed mode until the STC is initialized (since initially the STC is garbage). When the new STC from the timing-recovery logic is sent to the video decoder 710, the PTS in the stream will become valid (assuming the stream has accurate PCRs), and video decoding will begin.

During playback (from disk), the PCRs can no longer be viewed as a viable source for timebase management. The timing-recovery logic, however, is still vital to operation. In this situation, the timing-recovery logic would be used to synchronously update all STCs with DTS (or PTS) timestamps retrieved from the stream whenever necessary (i.e. during channel change or exiting trick modes). When the first DTS (or PTS) is seen in the incoming transport stream, the timing-recovery logic will initialize all STCs with this value. After the video STC is initialized, video decoding will begin smoothly. The timing-recovery logic monitors DTSs (or PTSs) in the stream against its own STC every so often and updates STC whenever necessary. This is called the "vsync" mode.

When switching between a live decoding and a PVR playback, the timing-recovery logic is programmed immediately after the switching to update all three STCs with the next PCR or DTS (or PTS) from the stream to adapt seamlessly to the new timebase.

When the user presses "CHANNEL CHANGE" at any PVR state, the decoding process switches back to the live-decoding mode.

Figure 8:
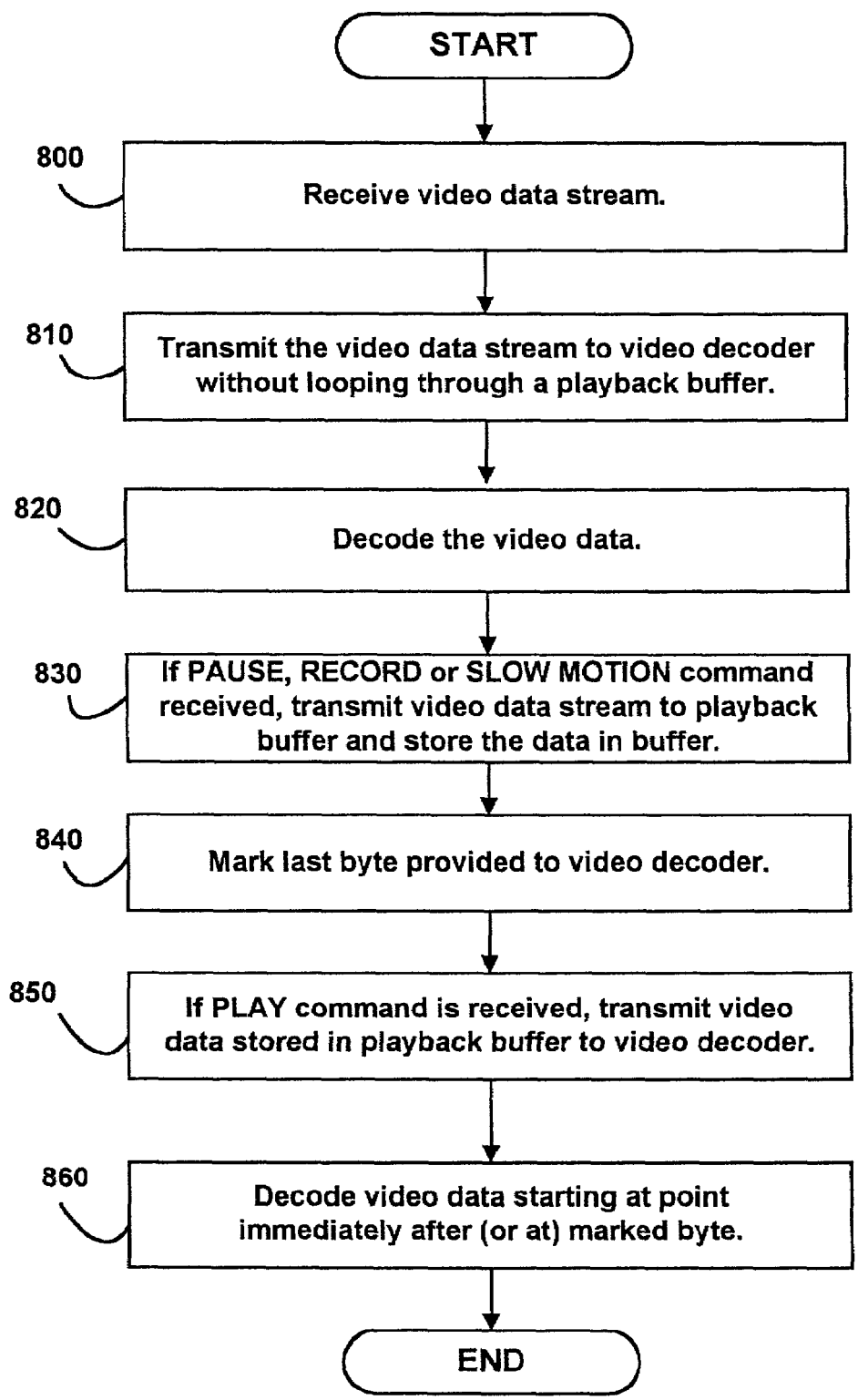
FIG. 8 is a flowchart representing a method of switching between a live video decoding and a recorded playback in a digital video and recording system according to an illustrative embodiment of the present invention.

FIG. 8 is a flowchart representing a method of switching between a live video decoding and a recorded playback in a digital video and recording system according to an illustrative embodiment of the present invention. At step 800, a stream of digital video data is received. At step 810, the received video data stream is transmitted to a video decoder 710 without first looping the video data stream through a playback buffer 730, 740. At step 820, the video data is decoded with the video decoder 710. At step 830, if a command is received that causes the video data stream to be looped through a playback buffer prior to further decoding, the steps that follow are performed. It will be noted that, illustratively, a command that causes the video data stream to be looped through a playback buffer prior to further decoding could be a PAUSE command, a RECORD command or a SLOW MOTION command, for example. If a command as indicated in step 830 is received, the video data stream is transmitted to a first-in first-out playback buffer 730, 740 and the video data is stored in the buffer 730, 740. Also, if a command as indicated in step 830 is received, the data element of the video data stream that was last transmitted to the video decoder 710 is marked, as indicated in step 840. Then, if a command requiring decoding of the video data stream to resume is subsequently received, the video data stored in the playback buffer 730, 740 is transmitted to the video decoder 710, as indicated in step 850. A command requiring decoding of the video data stream to resume would illustratively comprise a PLAY command. The video data received from the playback buffer 730, 740 is then decoded starting at a point immediately after the data element marked pursuant to step 840, as indicated in step 860.

Figure 9:
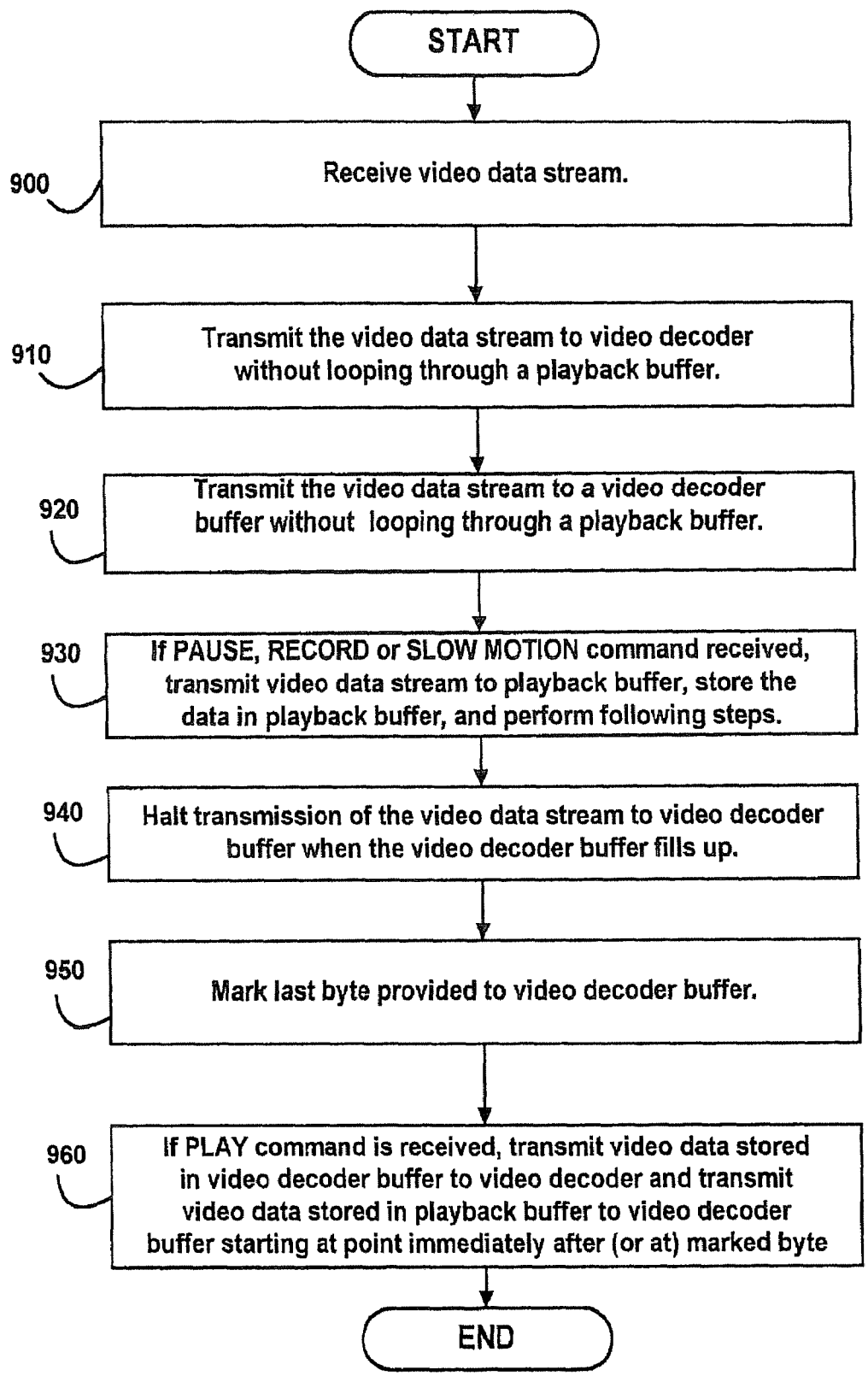
FIG. 9 is a flowchart representing a method of switching between a live video decoding and a recorded playback in a digital video and recording system according to an illustrative embodiment of the present invention.

FIG. 9 is a flowchart representing a method of switching between a live video decoding and a recorded playback in a digital video and recording system according to another illustrative embodiment of the present invention. At step 900, a stream of digital video data is received. At step 910, the received video data stream is transmitted to a first-in first-out video decoder buffer 700 without first looping the video data stream through a playback buffer 730, 740. At step 920, the video data stream is then transmitted from the video decoder buffer 700 to a video decoder 710 and the video data is decoded with the video decoder 710. At step 930, if a command is received that causes the video data stream to be looped through a playback buffer prior to further decoding, the steps that follow are performed. The video data stream is transmitted to a first-in first-out playback buffer 730, 740 while continuing to transmit the video data stream to the video decoder buffer 700, and the video data is stored in the playback buffer 730, 740. At step 940, transmission of the video data stream to the video decoder buffer 700 is halted when the video decoder buffer 700 fills up. At step 950, the last data element of the video data stream that was transmitted to the video decoder buffer 700 is marked. At step 960, if a command requiring decoding of the video data stream to resume is subsequently received, the video data stored in the video decoder buffer 700 is transmitted to the video decoder 710 and the video data is decoded. The video data stored in the playback buffer 730, 740 is transmitted to the video decoder buffer 700 starting at a point immediately after the data element that was marked in step 950.

Figure 10:
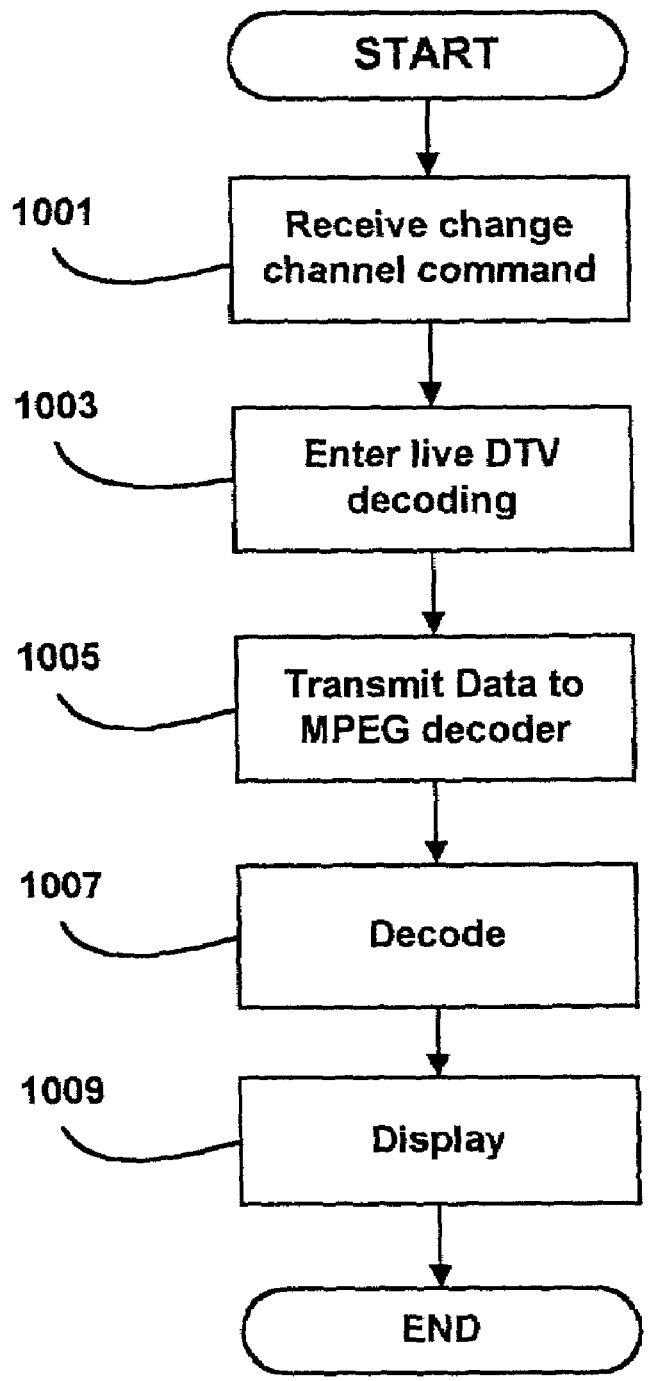
FIG. 10 is a flowchart representing a method of changing channels in a digital video and recording system according to an illustrative embodiment of the present invention.

FIG. 10 is a flowchart representing a method of changing channels in a digital video and recording system according to an illustrative embodiment of the present invention. At step 1001, a channel-change command is received from the user. At step 1003, the live DTV decoding process is initiated for the newly requested channel. In an illustrative embodiment, step 1003 includes demodulation of the video data, forward error correction (FEC) decoding, and filling up the video decoder buffer 700. At step 1005, the video data stream is transmitted to video decoder 710. At step 1007, the video data stream is decoded by video decoder 710. At step 1009, the decoded video is displayed. It will be noted that according to the method of FIG. 10, the video data of the newly acquired channel is not looped through a playback buffer such as FIFO1 730 and FIFO2 740. This avoids the time associated with reading in and out of memory.

Figure 11:
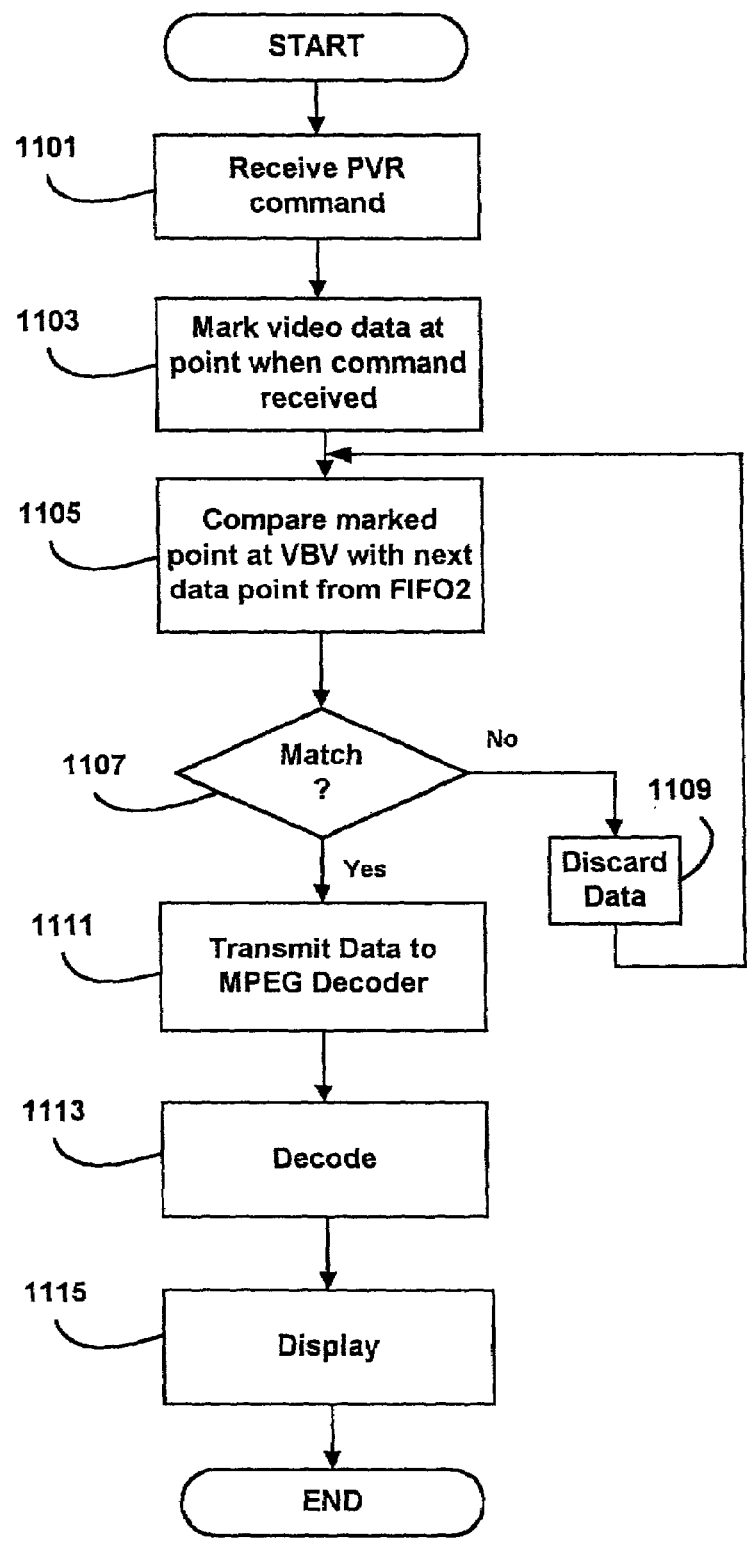
FIG. 11 is a flowchart representing a method of switching between a live video decoding and a recorded playback in a digital video and recording system according to another illustrative embodiment of the present invention.

FIG. 11 is a flowchart representing a method of switching between a live video decoding and a recorded playback in a digital video and recording system according to another illustrative embodiment of the present invention. At step 1101, a PVR command is received from the user. The PVR command can be any one of a pause command, a slow-motion command, a record command and a normal playback command. When the PVR command is received, the video data stream is sent to the play back buffer constituted by FIFO1 730 and FIFO2 740. At step 1103, the video data stream is marked at the point when the PVR command was received. This marking occurs at the input to video decoder buffer 700, which in an illustrative embodiment corresponds to the output of the FEC decoder, such as FEC decoders 110 and 310 in FIGS. 1 and 3, respectively.

At step 1105, the marked point in the data steam is compared to the next data point from FIFO2 740. If the compared data points are not a match pursuant to query box 1107, the data from FIFO2 is discarded as shown at step 1109. Then the next data point from FIFO2 is compared to the marked data point pursuant to step 1105. If, on the other hand, the compared data points are a match pursuant to query box 1107, the data in FIFO2 is transmitted to video decoder buffer 700, as shown at step 1111. Then at step 1113, the data stream is sent to video decoder 710, which decodes the data stream. At step 1115, the decoded video is displayed.

With the method of FIG. 11, it is possible to switch from live DTV decoding mode to PVR playback mode without having to relock demodulation of the video data stream. The method also prevents the display of "junk" data upon switching from live DTV decoding mode to PVR playback mode. In addition, the method allows a quicker transition from live DTV decoding mode to PVR playback mode.

With the present invention, many benefits are obtained. Seamless switching is achieved. Channel change is faster than in existing PVR applications that have seamless switching. Also, live decoding does not have to wrap through RAM buffers. Furthermore, switching from the live-decoding mode to the PVR playback mode doesn't cause the MPEG video re-acquisition process.

In summary, one embodiment of the present invention is directed to a digital video and recording system that includes a video decoder buffer 700, a video decoder 710, a playback buffer 730, 740 and a controller. The video decoder buffer 700 is a first-in first-out buffer that receives and stores a stream of digital video data. The video decoder buffer 700 is adapted to transmit the video data stream to the video decoder 710. The video decoder 710 decodes the video data stream received from the video decoder buffer 700. The playback buffer 730, 740 is a first-in first-out buffer that receives and stores the video data stream and is adapted to transmit the video data stream to the video decoder buffer 700. The controller sends the received video data stream to the video decoder buffer 700 during normal operation, but if a command is received that causes the video data stream to be looped through a playback buffer, the controller sends the video data stream to the playback buffer 730, 740 while continuing to send the video data stream to the video decoder buffer 700. When the video decoder buffer 700 fills up, the controller halts transmission of the video data stream to the video decoder buffer 700 and marks a data element that was last provided to the video decoder buffer 700. If a command requiring decoding of the video data stream to resume is received, the controller causes the video data stored in the video decoder buffer 700 to be transmitted to the video decoder 710 and causes the video data stored in the playback buffer 730, 740 to be transmitted to the video decoder buffer 700 starting at a point immediately after the marked data element.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the methods provided herein can also be applied over network video playback such as over Ethernet, DSL, etc., without departing from the scope and spirit of the present invention. Other modifications can also be made.

What is claimed is:

1. A method of switching between a live video decoding and a recorded playback in a digital video and recording system, comprising:
   (a) receiving a stream of digital video data;
   (b) transmitting the received video data stream to a first-in first-out video decoder buffer without first looping the video data stream through a playback buffer;
   (c) transmitting the video data stream from the video decoder buffer to a video decoder and decoding the video data with the video decoder;
   (d) if a command is received that requires the video data stream to be looped through a playback buffer prior to further decoding, performing steps of:
   (e) transmitting the video data stream to a first-in first-out playback buffer while continuing to transmit the video data stream to the video decoder buffer;
   (f) storing the video data in the playback buffer;
   (g) halting transmission of the video data stream to the video decoder buffer when the video decoder buffer fills up;
   (h) marking a data element of the video data stream that was last transmitted to the video decoder buffer;
   (i) if a command requiring decoding of the video data stream to resume is received, performing steps of:
   (j) transmitting the video data stored in the video decoder buffer to the video decoder and decoding the video data with the video decoder; and
   (k) transmitting the video data stored in the playback buffer to the video decoder buffer starting at one of the data element marked in marking step
   (h) and a point immediately after the data element marked in marking step (h).

2. The method of claim 1 wherein marking step (h) comprises saving an address that points to a data byte of the video data stream that was last transmitted to the video decoder.

3. The method of claim 1 wherein the command that requires the video data stream to be looped through a playback buffer prior to further decoding is one of a pause command, a slow motion command, a record command and a normal-playback command.

4. The method of claim 1 wherein once a command requiring decoding of the video stream to resume is received pursuant to step (i), and transmitting steps (j) and (k) are initiated, subsequent decoding of the video data stream is accomplished by sending the video data stream through the playback buffer before sending the video data stream to the video decoder buffer.

5. The method of claim 4 wherein the digital video and recording system comprises a digital television system and wherein the method further comprises:
   (j) if a channel-change command is received, repeating steps (a)–(i) for the video data stream of the new channel.

6. The method of claim 1 further comprising: if a command requiring decoding of the video data stream to resume is received pursuant to step (i), performing a step (1) of updating a system time clock using a timing reference element embedded in the video data transmitted to the video decoder.

7. A digital video and recording system comprising:
   a first-in first-out video decoder buffer adapted to receive a stream of digital video data, to store the video data, and to transmit the video data stream to a video decoder;

a video decoder adapted to decode the video data stream received from the video decoder buffer;

a first-in first-out playback buffer adapted to receive the video data stream, to store the video data, and to transmit the video data stream to the video decoder buffer; and a controller that sends the received video data stream to the video decoder buffer during normal operation, but wherein if a command is received that requires the video data stream to be looped through a playback buffer, the controller sends the video data stream to the playback buffer while continuing to send the video data stream to the video decoder buffer, wherein when the video decoder buffer fills up, the controller halts transmission of the video data stream to the video decoder buffer and marks a data element that was last provided to the video decoder buffer, and wherein if a command causing decoding of the video data stream to resume is received, the controller causes the video data stored in the video decoder buffer to be transmitted to the video decoder and causes the video data stored in the playback buffer to be transmitted to the video decoder buffer starting at one of the marked data element and a point immediately after the marked data element.

8. The system of claim 7 wherein the controller marks the data element that was last provided to the video decoder buffer by saving an address that points to a data byte of the video data stream that was last transmitted to the video decoder.

9. The system of claim 7 wherein the command that requires the video data stream to be looped through a playback buffer prior to further decoding is one of a pause command, a slow motion command, a record command and a normal-playback command.

10. The system of claim 7 wherein once a command requiring decoding of the video stream to resume is received, the controller effects subsequent decoding of the video data stream by sending the video data stream through the playback buffer before sending the video data stream to the video decoder buffer.

11. The system of claim 10 wherein the digital video and recording system comprises a digital television system and wherein if a channel-change command is received, the controller sends the video data stream of the new channel to the video decoder buffer without first looping the video data stream through the playback buffer, but wherein if a command is received that requires the video data stream to be looped through a playback buffer, the controller sends the video data stream to the playback buffer.

* * * * *